United States Patent [19]

Eckstrom et al.

[11] Patent Number: 4,630,530
[45] Date of Patent: Dec. 23, 1986

[54] FILTERING SYSTEMS FOR BUSES

[75] Inventors: William R. Eckstrom, Dolton, Ill.; John R. Conrad, Westlake Village, Calif.

[73] Assignee: Travel-Aire, Inc., Dolton, Ill.

[21] Appl. No.: 608,382

[22] Filed: May 9, 1984

[51] Int. Cl.$^4$ .............................................. B60H 3/06
[52] U.S. Cl. ........................................ 98/2.11; 55/279;
   55/316; 55/385 B; 55/387; 55/481; 55/126;
   4/209 FF; 422/186.1; 98/33.1; 62/244
[58] Field of Search ................ 55/279, 316, 124, 125,
   55/126, 139, 467, 385 R, 387, 481, 385 B;
   422/186.1, 186.04, 121–124; 4/209 R, 458, 209
   FF; 98/2.11, 33 A; 502/415, 324; 62/244

[56] References Cited

U.S. PATENT DOCUMENTS

| | | | |
|---|---|---|---|
| 2,203,814 | 6/1940 | Clements | 98/10 |
| 2,320,596 | 6/1943 | Henney | 62/244 |
| 2,338,931 | 1/1944 | Gould | 62/244 |
| 3,049,399 | 8/1962 | Gamson et al. | 55/74 |
| 3,072,978 | 1/1963 | Minto | 55/279 |
| 3,149,552 | 9/1964 | Stunkard | 98/33 A |
| 3,299,620 | 1/1967 | Hollingsworth | 55/279 |
| 3,606,998 | 9/1971 | Porte et al. | 55/279 |
| 3,744,216 | 7/1973 | Halloran | 422/121 |
| 3,883,637 | 5/1975 | Benedict | 422/122 |
| 3,930,818 | 1/1976 | McDougal | 55/467 |
| 3,956,458 | 5/1976 | Anderson | 55/6 |
| 4,210,429 | 7/1980 | Goldstein | 55/279 |
| 4,227,446 | 10/1980 | Sone et al. | 55/126 |
| 4,244,712 | 1/1981 | Tongret | 55/279 |

FOREIGN PATENT DOCUMENTS 127030  7/1983  Japan ..................... 55/126

*Primary Examiner*—Bernard Nozick
*Attorney, Agent, or Firm*—Russell E. Hattis; Stephen R. Arnold

[57] ABSTRACT

A filtering unit for a bus, the unit comprising one outer housing of a size to fit between the row of seats in the bus and a forwardly facing wall of a bus lavatory behind the seats, the housing having air inlet and air outlet openings for communication with ducts opening in upper and lower portions of the lavatory. The housing comprises a main housing body with an interior horizontal passageway of consistent cross sectional shape extending parallel to the rear of the outer housing, the main housing body having a horizontally facing opening at the outer end thereof which is covered by a panel which is movable to expose said opening, and a drawer unit slidable into or removable from said passageway through said opening. The drawer contains at least an air filter for removing at least lavatory odor-causing gaseous and particle materials from the air stream passing therethrough and an air circulating fan and drive motor therefor.

20 Claims, 12 Drawing Figures

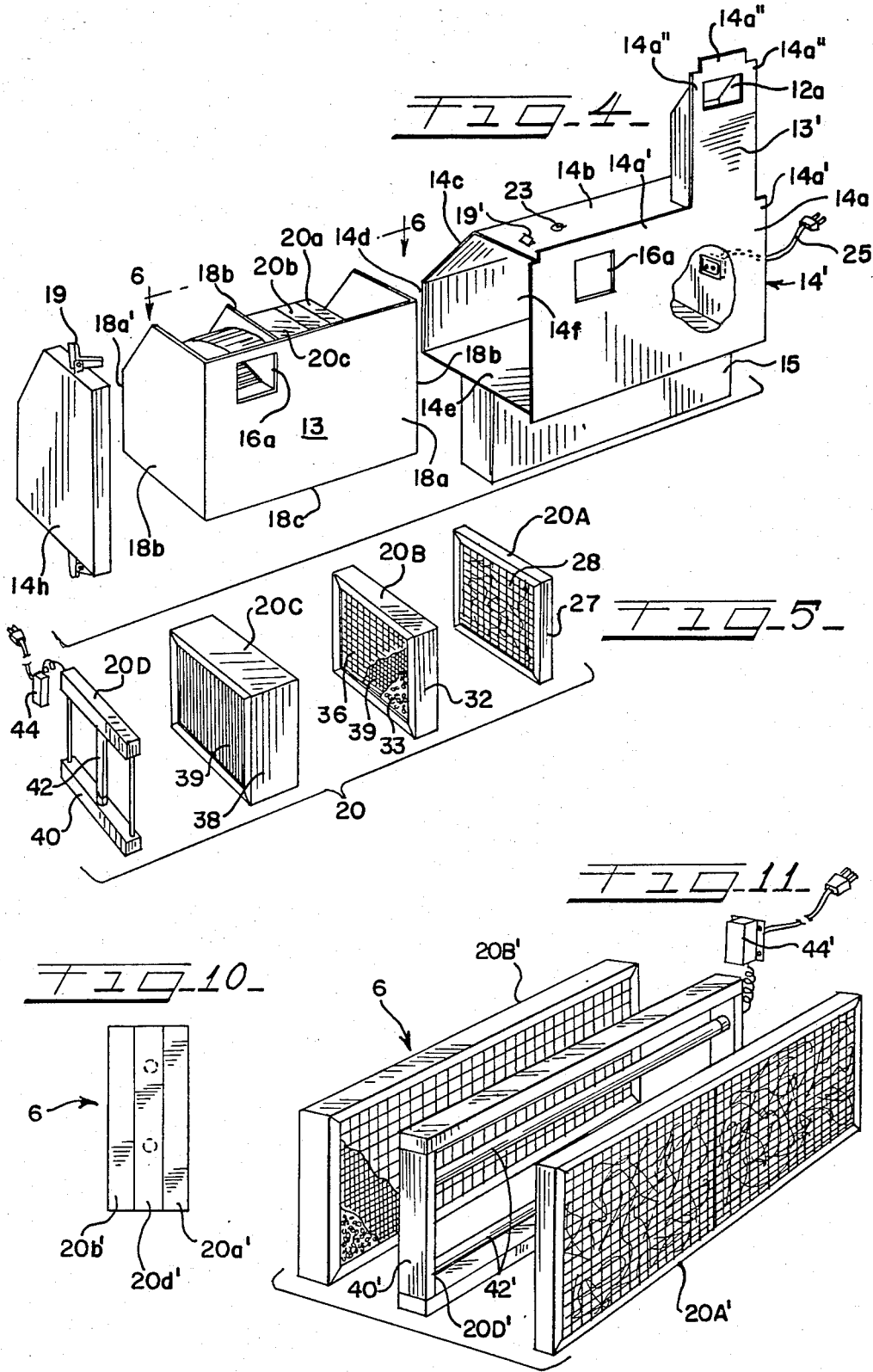

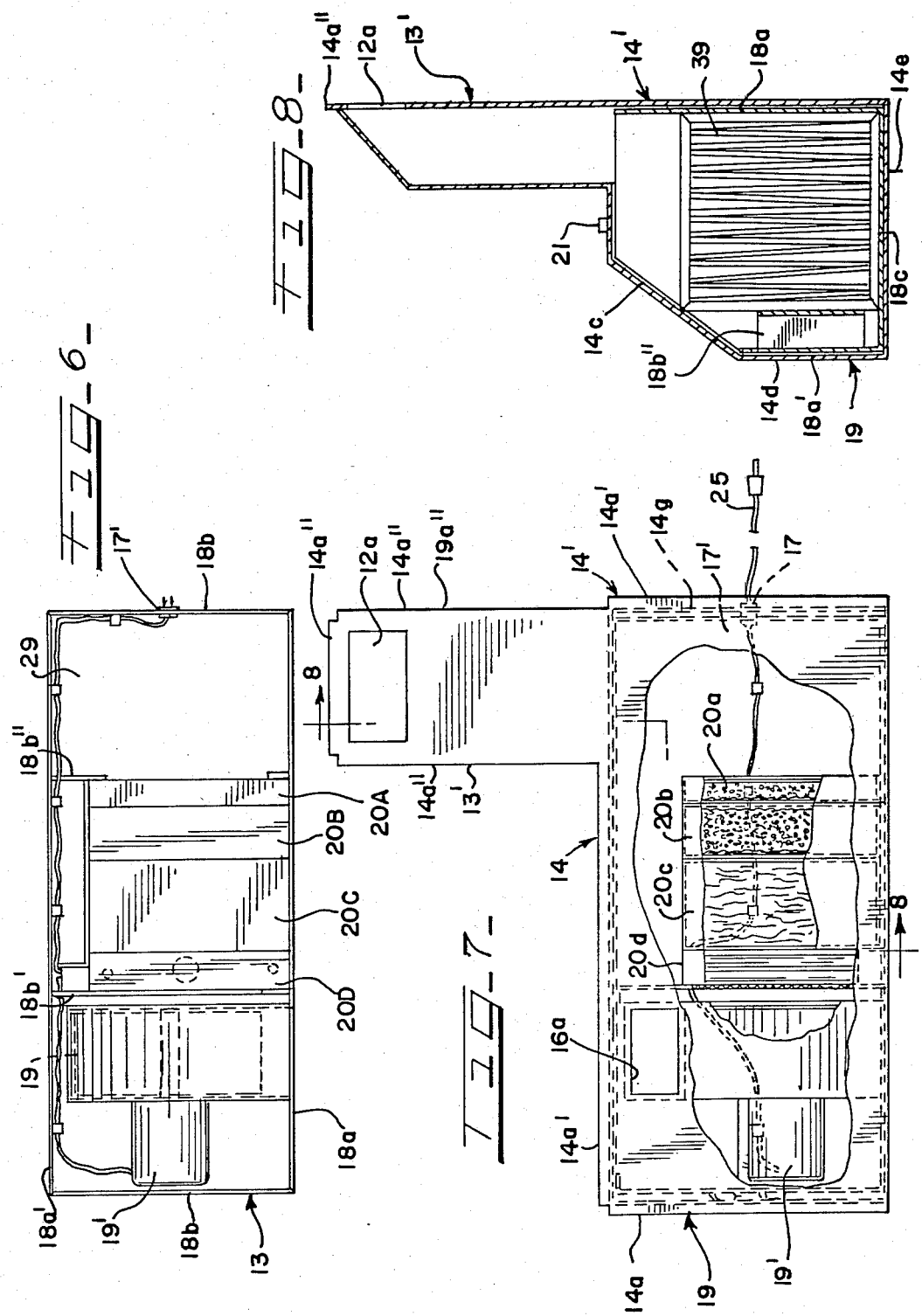

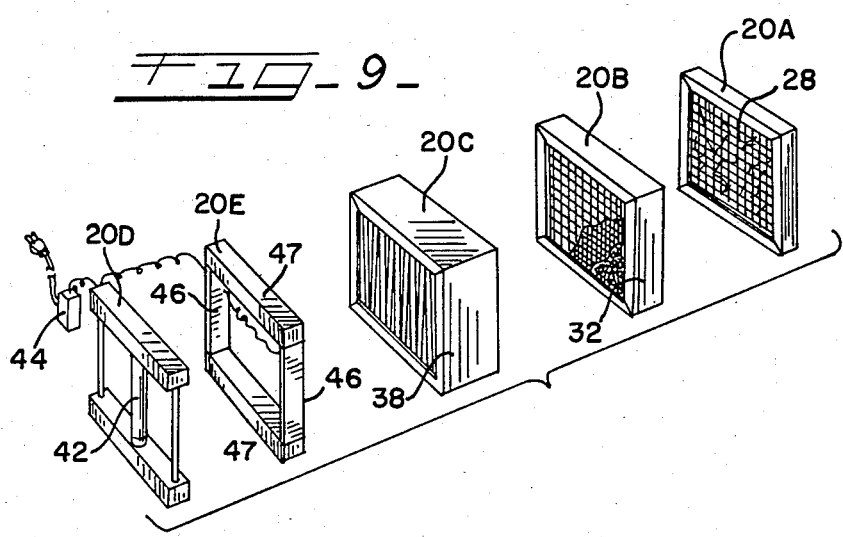
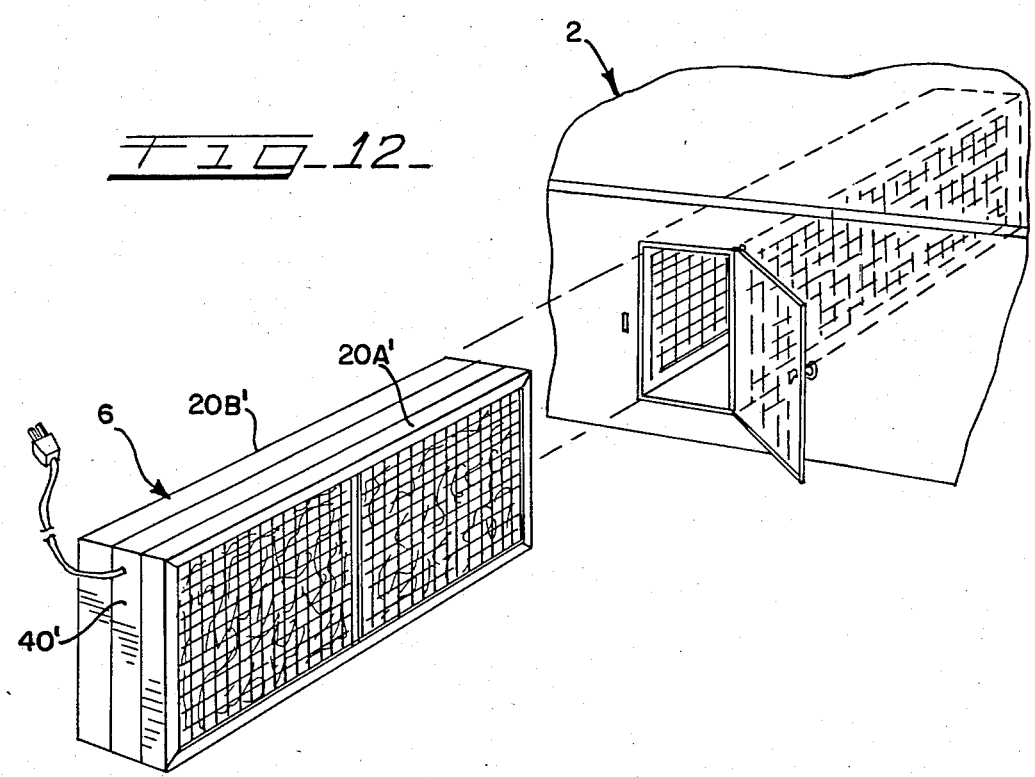

FILTERING SYSTEMS FOR BUSES

TECHNICAL FIELD OF THE INVENTION

This invention relates to filtering systems having its most important application in buses. Some of the filtering systems disclosed herein are used by inserting the same in the path of flow of outside air into the bus through exterior vent openings as, for example, by insertion into the inlet duct of the bus air conditioning system or the air inlet at the front of the bus. The most important filtering system of the invention is an air filtering unit mountable between the lavatory wall and the rear row of seats of buses having lavatory facilities for deodorizing and filtering lavatory air.

BACKGROUND OF THE INVENTION

To our knowledge, filtering systems have not been heretofore provided which can be added easily to already fully constructed buses and which efficiently remove a wide variety of pollutants which gain entry to the bus interior from outside the bus or from the bus lavatory. These pollutants include fecal and urine odor-producing pollutants and dust, soot, pollen, bacteria, pathogenic mole spores, and dust associated viruses. Conventional filters used heretofore in buses are filters for removing primarily large or heavy solid materials such as soot, pollen, ragweed, dust and the like. Odors have been dealt with primarily by odor-masking rather than odorproducing particle-removing means.

SUMMARY OF THE INVENTION

One of the important aspects of the present invention is the provision of a filtering unit which fits between the rear row seats of most buses and the forwardly facing vertical wall of a bus lavatory. The most preferred form of such a filter unit includes a circulating fan and a filtering system through which the air is forced and which removes many of the more difficult to remove smaller pollutant particles including pathogenic particles as small as about 0.3 microns, in addition to the larger particles removed by conventional filters. The filtering system preferably includes a series of filters for removing particles of progressively decreasing size and also ozone generating means and in some cases a charged iongenerating means. While broadly a combination of filtering elements which remove particles of progressively decreasing size is not per se new, it is believed unique to add to such filter elements ozone and/or ion-generating means to be described. Also various forms of the invention described are uniquely designed for minimum servicing and for ease of massproduction and installation thereof.

Another aspect of the invention is the provision of a filtering unit having a fewer number of filtering elements than that just described and uniquely combining an ozone-generating element so that it can be conveniently inserted in the small spaces of air inlet ducts commonly found in buses at the front thereof or in the inlet duct of the bus air conditioning system. The ozone destroys odor causing bacteria not substantially affected by the other stations of the filtering systems. Most advantageously, the ozone-generating is an ultraviolet lamp ozone-generating unit sandwiched between an air filtering element for removing relatively large, heavy solid particles like dust or the like, and one or more other particle-removing air filtering elements for removing smaller odor-producing particle contaminants from the air stream. In such case, the ultraviolet lamps involved are not readily exposed to the ambient dust conditions because of the isolation thereof by the filtering elements on the opposite sides thereof included in the filtering unit as described.

One of the features of the invention used in the lavatory air filtering unit is that the rear portion of the outer housing thereof has air inlet and air outlet openings facing horizontally and rearwardly, so that they can confront openings which conveniently can be cut in the lavatory wall. Preferably, the air inlet opening of the filtering unit is located at the top of the vertically extending duct-forming portion of the filter unit housing. Another feature of this filtering unit is that the rear portion of the housing has co-planar vertical wall surfaces or flanges adapted to extend flush against the vertical lavatory wall where openings in the rear wall of the housing can closely confront the lavatory wall. Still another feature of this aspect of the invention is that the outer housing has an upper portion at the front thereof with a downwardly and forwardly inclining front wall portion to clear the rearwardly sloping back portion of the adjacent row of seats. Also, most advantageously, the housing unit is supported on a relatively narrow pedestal which raises the bottom portion of the outer housing to a convenient height.

Another important unique feature of the lavatory air filtering unit is that the outer housing has a main housing portion with an interior horizontal passageway of consistent cross-section preferably extending parallel to the rear of the outer housing. This main housing portion has a horizontally facing opening for this passageway at the outer end thereof to be located adjacent to the center isle of the bus and which is covered by a panel and removable to expose the opening. A drawer unit is passable into or removable from the passageway through this opening. The drawer includes filtering system preferably in the form of individual filtering elements which filter out different types of pollutants to be described. This drawer unit also preferably includes a circulating fan and drive motor therefor, and most advantageously connector means on the inner end of the drawer which, when the drawer is fully inserted within the outer housing portion, automatically makes connection with complimentary connector means so that the fan is ready to operate upon the closure of a power on-off switch. When the drawer is moved to an open position, the individual filtering elements are accessible for individual removal and replacement. The filtering elements of the drawer preferably include an ozone generating unit most advantageously in the form of ultraviolet lamps. The filtering system also may include charged ion-generating plates. The ultraviolet lamps and charged ion-generating plates are placed where they need be cleaned only occasionally, namely at the end portion of the filtering system where the larger particles to be filtered have already been removed from the air stream.

The above and other features of the invention will become apparent upon making reference to the specification to follow, the claims and the drawings.

DESCRIPTION OF DRAWINGS

FIG. 4 is an exploded view of the different basic elements making up the filtering unit shown in FIG. 2;

FIG. 5 is an exploded view of the filtering elements contained in the drawer shown in FIG. 4;

FIG. 6 is a plan view of the drawer portions of FIG. 4;

FIG. 7 is a rear elevational view of the filtering unit shown in FIG. 6, with a portion of the rear wall of the housing of the unit broken away to show the interior construction thereof;

FIG. 8 is a vertical offset sectional view through the filter unit shown in FIG. 7, taken along section lines 8—8 therein;

FIG. 9 is an exploded view of a modified filtering system like that shown in FIG. 5 with the addition of a charged ion filtering station;

FIG. 10 is an elevational view of a compact filtering unit which is insertable in the inlet duct at the front of the bus or the inlet duct of the air conditioning system of the bus;

FIG. 11 is an exploded view of the three stations which make up the filtering unit of FIG. 10; and FIG. 12 is a view illustrating the manner in which the filtering unit of FIG. 10 is integrated into a single compact filtering unit and insertable as a unit to a section of a bus air conditioning system.

DESCRIPTION OF EXEMPLARY FORMS OF THE INVENTION SHOWN IN THE DRAWINGS

Figure 1:
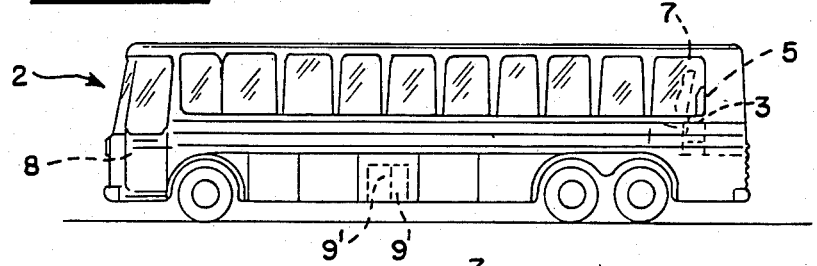
FIG. 1 is a side elevational view of a bus which identifies the three locations in the bus where filtering systems of the present invention may be applied.
Figure 2:
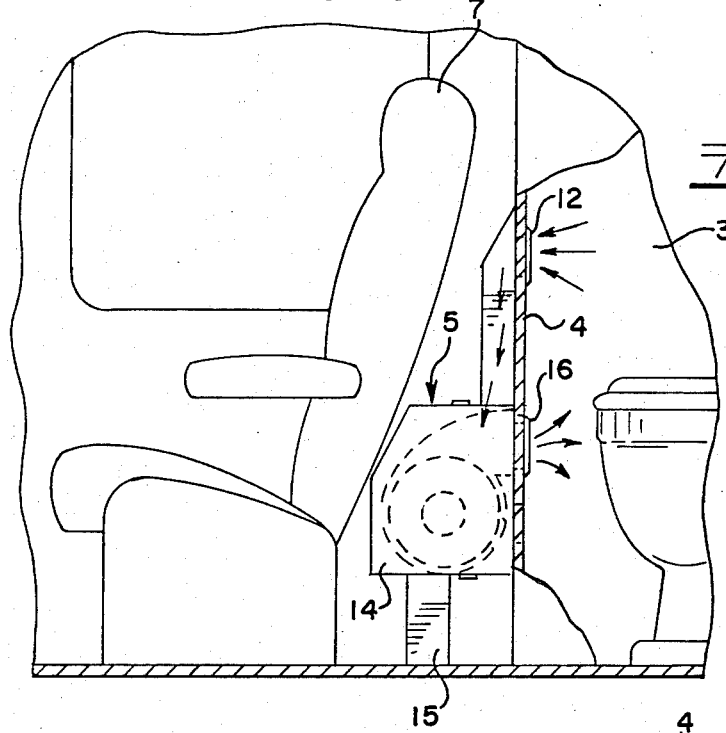
FIG. 2 is a vertical elevational view of the rear end portion of the bus of FIG. 1 and shows the rear row of seats and the forwardly facing vertical wall of a bus lavatory between which one of the forms of the present invention is located for filtering out various odor and other pollutants found in the bus lavatory.
Figure 3:
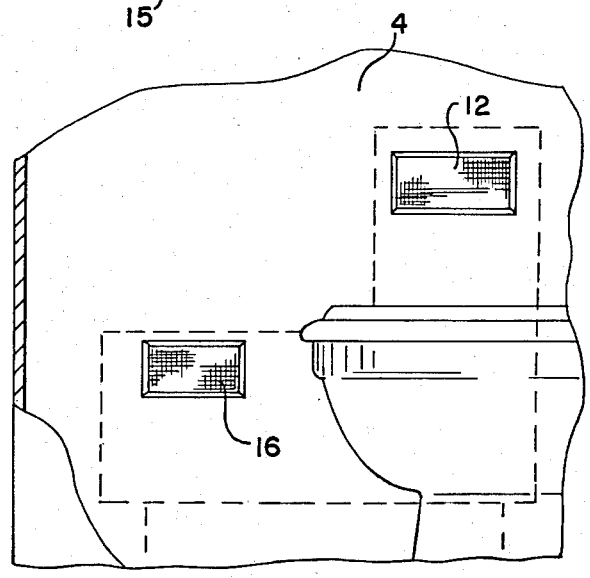
FIG. 3 is a fragmentary elevational view of a portion of the bus lavatory showing the openings in the vertical lavatory wall which communicate with corresponding openings in the filtering unit of some of the invention shown in FIG. 2.

FIGS. 1–3 illustrate the application of the present invention to a transcontinental bus 2 having a lavatory room 3 at the rear of the bus. A filtering unit 5 is shown mounted between the front wall 4 of the lavatory and a rear row of seats 7 on one side of the bus. FIGS. 8–10 illustrate another form of the invention comprising a very compact filtering unit 6 having unique filtering capabilities and a construction which enables it to be mounted either in the inlet air duct 8 at the front of the bus 2 or in the inlet duct 9 of an air conditioning system 9' (FIG. 1).

As those shown, the lavatory filtering unit 5 of the invention is most preferably constructed in the manner best shown in FIGS. 4–8. The vertical lavatory wall 4 is provided with an upper air inlet opening 12 and a bottom air discharge opening 16 to respectively communicate with openings 12a and 16a formed at the rear of the outer housing 14 of the filtering unit 5. The outer housing 14 includes a main body 14' preferably made of sheet metal and having a horizontal opening 14f (see FIG. 4) at the outer end thereof facing the center of the bus. A filter and fan motor-containing drawer 13 is insertable within a compartment or passageway in the main housing body 14' extending parallel to the lavatory wall 4. When the drawer 13 is fully inserted within the housing body 14', the opening 14f can be closed by a cover 14h which can be secured to the main housing body 14' in any suitable way, such as by locking means 19 on the cover engaging with complimentary locking means 19' on the main housing body 14'. When the cover 14h is removed, the drawer 13 can be fully or partially removed from the passageway within the main housing body 14', a series of filtering elements 20 in the drawer become assessible for individual removal. These filtering elements will be later described.

The drawer 13 carries a fan 19 (FIG. 6) located adjacent to the air discharge opening 16a, the fan being driven by a motor 19'. The drawer 15 has an electrical connector 17' (FIG. 7) at the inner end thereof which makes connection with a complimentary electrical connector 17 on the inside vertical end wall 14g of the main housing body 14', so that when the drawer 13 is fully inserted within the housing body 14' electricity is connected to the motor 19' through a suitable manual on-off switch 23 (FIG. 4) shown on the horizontal upper wall 14b of the housing body 14'. A power cord 25 is shown extending from the housing body 14' for connection to a suitable electrical outlet.

While the various parts of the filter unit 5 shown in the drawings could have a variety of configurations, it is most advantageously constructed in the manner now to be described.

Projecting from the vertical rear wall 14a of the main housing body 14' are coplanar vertical flanges 14a' adapted to be secured by screws or the like to the vertical lavatory wall 4. A duct 13' projects up from the top of the main housing body 14' and terminates in the air inlet opening 12a. The rear wall of duct 13' has coplanar vertical flanges 14a" which receive screws for securing the same to the vertical lavatory wall 4.

The main housing body 14' has a downwardly and forwardly inclining front wall portion 14c merging with the top wall 14b to provide a clearance space for the filter unit housing 14 behind the rear row of seats 7, as best shown in FIG. 2. The inclining front wall wall 14c joins a short vertical front wall 14d which, in turn, joins a horizontal bottom wall 14e. The bottom wall 14e is secured to a pedestal 15 which supports the filter unit 5 in an elevated position, as best shown in FIG. 2.

The filter and fan motor-containing drawer 13 preferably has a box-like construction as shown, and includes spaced vertical longitudinal walls 18a–18a' between which extend vertical end walls 18b–18b. The drawer has a bottom wall 18c. The drawer has partition walls 18b' and 18b" with openings in the center thereof to permit the passage of air therethrough. The partition 18b' divides the drawer into front and rear compartments, the front compartment containing the fan 19 and the fan motor 19' and an adjacent compartment containing the various filtering elements 20 to be described. While a cover could be placed over the open top of the drawer as shown, since the outer housing portion forms a dust cover for the drawer such a cover is not necessary. Also, if desired, handles (not shown) could be placed on the drawer to make it much easier to manipulate when the drawer is removed from the main housing body 14'.

Refer now to FIG. 5 which is an exploded view of the different filtering elements 20 which are supported within the drawer 13 between partition walls 18b' and 18b". The filtering elements shown include a first filtering unit 20A for removing large or heavy solid materials, such as dirt, soot, pollen, ragweed and dust. It is shown as including a peripheral frame 27, the inlet and outlet ends of which are covered by a screen 28 to confine a suitable fibrous filter such as commonly used in furnaces for filtering out large or sized particles.

The next filtering element 20B also has a peripheral frame 32 defining front and rear openings each of which is covered over by an inner fine wire mesh screen 34 and a much larger outer mesh screen 36 made of much heavier wire. Between these screens 34-36 is confined a dispersed mixture of activated carbon and ULTRAFIL pellets 33. The activated carbon traps and destroys contaminants such as cigarette smoke and other gaseous contaminants. ULTRAFIL is effective in screening out various contaminants having particle sizes much smaller than dust. ULTRAFIL can comprise pellets of about $\frac{1}{8}$ inch in size and activated carbon can comprise pellets of about $\frac{1}{4}$ inch in size. ULTRAFIL pellets are a blend of activated alumina $A_3$) impregnated with potassium permanganate and a small amount of free water.

The next filtering element 20C is preferably a HEPA sheet filter which is a bacterialogical air filter capable of entraping small particles of bacteria, pathogenic mold spores, dust associated virus and other particles as small as about 0.3 microns. The HEPA filters comprise a porous sheet 39 impregnated with dioctylphthalate aerosal DOP. The filtering element 20C is shown as having an outer framework 38 with the HEPA sheet 30 folded into a zigzag shape as shown to provide a maximum exposed area.

The last stage of the filtering system is an ultraviolet lamp unit 20D which acts as an ozone-generator which generates ozone into the immediate area. The ozone-generating unit 20D is shown as comprising a frame 40 which supports one or more ozone-generating ultraviolet lamps 42. The ultraviolet lamp 42 is energized through a suitable ballast unit 44, in turn, connected to a source of electricity, namely the connector means 17' shown in FIG. 7.

Refer now to FIG. 10 which shows a modification of the filtering system shown in FIG. 5 in that there is added between the HEPA filtering element 20C and the ozone-generating ultraviolet unit 20D a filtering station 20E comprising pair of iongenerating plates 46-46 laterally straddling the path of flow of the air through the filtering element 20C. A pair of insulating arms 47-47 extend between the plates 46-46. These plates are connected to a source of high voltage to create a charge attracting environment which will attract particles which might not otherwise had been filtered out by the filtering elements 20A, 20B, and 20C.

Refer now to FIGS. 10-12 which illustrate a filtering unit 6 which can be inserted into the inlet duct at the front of the bus or the inlet duct of an air conditioning system of the bus. The filtering unit 6 is shown as comprising a filtering element 20A' which may be substantially identical except as to shape to the filtering element 20A previously described, a filtering element 20B' which may be similar to the filtering element 20B previously described, except as to shape, and an ozone-generating ultraviolet lamp unit 20D' which is sandwiched between the filtering elements 20A' and 20B'. The ozone-generating unit 20D' includes a peripheral frame 40' between the opposite ends of which extend a pair of ultraviolet lamps 42'-42' individually removable from lamp sockets (not shown). A special clamping means (not shown) may be provided to clamp the filtering elements 20A', 20D' and 20B' together. Since the ultraviolet lamps are encased or surrounded by the frame and the filtering elements 20A' and 20B', the external ducts do not have ready access to the lamps.

The present invention has thus provided a unique filtering unit insertable between the rear row of seats of a bus and the adjacent lavatory wall, and filtering units insertable in the inlet duct of a bus or the bus air conditioning system. While the prior art has heretofore combined filtering units like the filtering units 20A, 20B, and 20C, they have not combined such filtering elements with ultraviolet lamp ozone-generating units or with charged ion-generating units. The resultant filtering system uniquely provides an effective combination of means for providing clean air in a manner where the filtering units are effectively, efficiently and economically designed, and wherein the positions of the filtering elements are such as to maximize the efficiency of the ultraviolet lamp and ion-generating unit, which could be readiy clogged with dust requiring overly frequent change, except for the unique position and relationship thereof to the other filtering elements as described.

It should be understood that numerous modifications may be made in the most preferred forms of the invention described without deviating from the broader aspects of the invention.

We claim:

1. In a bus having a forwardly facing vertical lavatory wall spaced opposite a row of seats in the bus, said wall having a pair of openings extending therethrough, the improvement comprising:
a filtering unit with an outer housing between said row of seats and said lavatory wall, the housing having horizontally facing openings at the rear portion thereof communicating with said pair of openings in said vertical lavatory wall, said housing including air circulating fan means for drawing air from one of said housing openings and discharging air from the other of said openings, and air filtering means in the path of movement of said air in said housing between said housing openings.

2. The bus of claim 1 wherein said rear portion of said outer housing has vertical coplanar vertical wall surfaces extending extend flush against said vertical lavatory wall.

3. The bus of claim 3 wherein one of said housing openings is located at the top of a vertically extending duct-forming portion of said housing and defined by a rearwardly facing duct opening communicating with the interior of the portion of the housing therebelow.

4. A filtering unit for a bus, the unit comprising outer housing of a size to fit between a row of seats in the bus and a forwardly facing vertical wall of a bus lavatory behind said row of seats, the housing having an upper portion with a downwardly and forwardly inclining front wall portion for clearing the rearwardly sloping back portion of the adjacent row of seats, and air inlet and air outlet openings for communication with openings in vertically spaced portions of said vertical lavartory wall, said housing including air circulating fan means for drawing air from said air inlet opening and discharging filtered air through said air outlet opening, and an air filtering means in the path of movement of said air in said housing between said air inlet and air outlet openings and including means for removing at least lavatory odor-causing gaseous and particle materials from the air stream passing therethrough.

5. The bus or filtering unit of claim 2, or 4, or wherein said housing has projecting from the bottom thereof a relatively narrow pedestal which raises the bottom portion of the outer housing to a convenient height.

6. The filtering unit of claim 4 wherein said housing has projecting from the bottom thereof a relatively narrow pedestal which raises the bottom portion of the outer housing to a convenient height.

7. The filtering unit of claim 4 wherein said filtering means includes a first particle-removing air filtering section including first means for removing relatively large heavy solid materials, like dust, one or more other intermediate particle-removing air filtering sections downstream from said first station and including means for removing smaller odor-producing particle contaminants from the air stream passing therethrough, and a particle-removing air filtering section located between said one or more intermediate sections and the filtered air outlet end of said filtering means and including means for removing minute pathogenic particulates from the air stream passing therethrough.

8. The filtering unit of claim 4 wherein said filtering means includes a first particle-removing air filtering section including means for removing relatively large particles like dust from the air stream passing therethrough, at least one particle-removing air filtering section between said first section and the outlet end of said filtering means and including means for removing smaller odor-causing particle contaminants from the air stream passing therethrough, and an ozone-generating means for exposing the air stream to ozone after said first section.

9. The filtering unit of claim 4 wherein said filtering means includes a first section including means for removing said smaller odor producing particle contaminants from the air stream passing therethrough, and a multipurpose air filtering means which comprises a mixture of small and large dispensed particles which respectively filter different particles from the air stream.

10. In a bus having a forwardly facing vertical lavatory wall spaced opposite a row of seats in the bus located on one side of an aisle in said bus, said wall having a pair of openings extending therethrough, the improvement comprising:
a filtering unit with an outer housing between said row of seats and said lavatory wall, said outer housing having therein a horizontal passageway of substantially constant cross sectional shape extending parallel to the rear of the outer housing, the outer housing having a horizontal opening at the outer end thereof facing said aisle and which is covered by closure means movable to expose said opening, and a drawer unit slidable into or removable from said passageway through said opening, the drawer containing air filtering means and said drawer when moved to an exposed position providing access to said filtering means for replacement thereof.

11. The bus of claim 10 wherein said drawer also includes said circulating fan means and drive motor therefor.

12. The bus of claim 1, or 10 wherein said filtering means includes a first particle-removing air filtering means including means for removing relatively large particles like dust and the like from the air stream passing therethrough, at least one particle-removing air filtering means between said first means and the outlet end of said filtering means and including means for removing smaller odor-causing particle contaminants from the air stream passing therethrough, and an ozone-generating means for exposing the air stream to ozone after said first means.

13. The bus of claim 2, or 7 wherein said filtering means includes a first means including means for removing said smaller odor-producing particle contaminants from the air stream passing therethrough, and a multipurpose air filtering means which comprises a mixture of small and large dispensed particles which respectively filter different particles from the air stream.

14. The bus of claim 1 or 10 wherein said filtering means includes a first particleremoving air filtering section including first means for removing relatively large heavy solid materials, like dust or the like, one or more other intermediate particle-removing air filtering sections downstream from said first station and including means for removing smaller odor-producing particle contaminants from the air stream passing therethrough, and a particle-removing air filtering section located between said one or more intermediate sections and the filtered air outlet end of said filtering means and including means for removing minute pathogenic particulates from the air stream passing therethrough.

15. The air filtering assembly of claim 10 wherein each of said filtering means comprises a peripheral frame defining similarly-sized air inlet and outlet openings, the peripheral frames being in abutment to form a sandwich of such elements.

16. In a filtering unit for a bus the filtering unit comprising a housing having air inlet and air outlet openings, said housing including air circulating fan means for drawing air from said air inlet opening and discharging air from the air inlet opening, and air filtering means in the path of movement of said air in said housing between said housing openings, the improvement wherein said housing has therein a horizontal passageway of substantially constant cross sectional shape, the housing having a horizontally facing opening at the outer end thereof which is covered by a closure which is movable to expose said opening, and a drawer unit slidable into or removable from said passageway through said opening, the drawer containing said air filtering means and when moved to an exposed position providing access to said filtering means for replacement thereof, said drawer also including said air circulating fan means and a drive motor therefor.

17. The bus of claim 8 or 16 wherein said drawer has electrical connector means which automatically mate with complimentary connector means in said main housing body when said drawer is moved to a fully retracted position in said main housing body.

18. An air filtering system for removing dust and other relatively large particle-containing contaminants from an air stream as well as much smaller odor-producing contaminants of an air stream, said filtering system comprising an integrated assembly of serially disposed individual air filtering units of about the same size and located between air inlet and filtered air outlet ends of the assembly, the assembly being adapted to be inserted as an integrated whole into a duct but where each filtering unit is separable from the other for replacement purposes, each unit comprising a peripheral frame defining similarly sized air inlet and outlet openings, the peripheral frames of the filter units being in abutment to form a sandwich of such elements, a first filtering unit located nearest said air inlet and including filtering means for removing relatively large heavy solid materials, like dust, a second filtering unit downstream from said first filtering unit including means for removing said smaller odor-producing particle contaminants from the air stream passing therethrough, and a third filtering unit located between said first and second units and having its peripheral frame sandwiched between and being peripherally sealed between the peripheral frames of the other filtering units, said third filter unit being an ultraviolet lamp-containing unit for destroying odor-producing bacteria.

19. The air filtering system of claim, 18 wherein the odor-producing particle filtering means is a multi-purpose air filtering unit which comprises a mixture of small and large dispersed particles which filter different particles from the air stream.

20. The air filtering system of claim 13 wherein one of said filtering units is a multi-purpose air filtering unit which comprises a mixture of small and large dispersed particles which filter differently sized odor-producing particles from the air stream, said mixture of particles being retained in place by an inner fine mesh screen of smaller mesh size than the smaller particles and a much heavier gauge wire on the outside of said five mesh screen to support the fine mesh screen against breakage when it expands under the pressure of the particles.

* * * * *